(12) United States Patent
Ueno (10) Patent No.: US 11,192,263 B2
(45) Date of Patent: Dec. 7, 2021

(54) ROBOT HAND AND CONTROL METHOD FOR THE ROBOT HAND

(71) Applicant: CANON KABUSHIKI KAISHA, Tokyo (JP)

(72) Inventor: Masamichi Ueno, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 16/217,512

(22) Filed: Dec. 12, 2018

(65) Prior Publication Data

US 2019/0184580 A1 Jun. 20, 2019

(30) Foreign Application Priority Data

Dec. 14, 2017 (JP) .............................. JP2017-239915

(51) Int. Cl.
| | | |
|---|---|---|
| *B25J 15/10* | (2006.01) | |
| *B25J 9/16* | (2006.01) | |
| *B25J 9/00* | (2006.01) | |
| *B25J 9/08* | (2006.01) | |
| *B25J 13/08* | (2006.01) | |
| *B25J 15/02* | (2006.01) | |
| *B25J 15/00* | (2006.01) | |

(52) U.S. Cl.
CPC .......... *B25J 15/103* (2013.01); *B25J 9/0009* (2013.01); *B25J 9/08* (2013.01); *B25J 9/1694* (2013.01); *B25J 13/082* (2013.01); *B25J 15/0061* (2013.01); *B25J 15/0266* (2013.01)

(58) Field of Classification Search
CPC ................. B25J 15/10; B25J 9/16; B25J 9/00
See application file for complete search history.

(56) References Cited

U.S. PATENT DOCUMENTS 8,585,111 B2 * 11/2013 Nammoto ................ B25J 15/10
294/106
8,827,337 B2 * 9/2014 Murata ................ B25J 15/0009
294/106

(Continued)

FOREIGN PATENT DOCUMENTS

JP 2009-148846 A 7/2009
JP 2010-172970 A 8/2010

(Continued)

OTHER PUBLICATIONS

Takashi Sonoda et al. "Multi Fingered Robotic Hand Employing Strings Transmission Named Twist Drive"; 6 pages (Year: 2010).*

*Primary Examiner* — Kira Nguyen
(74) *Attorney, Agent, or Firm* — Canon U.S.A., Inc. I.P. Division (57) ABSTRACT

A robot hand is provided and includes a robot hand control unit that has at least three gripping fingers on a base and controls the robot hand, a plurality of drive mechanisms that brings the three gripping fingers independently close to or separate from each other, a plurality of drive control units that individually controls each of a plurality of drive sources of the plurality of drive mechanisms, and a distribution control unit that is disposed on the base and distributes an instruction value from the robot hand control unit to the plurality of drive control units associated with the plurality of gripping fingers. At least one of the gripping fingers includes an integrally formed drive source and drive control unit.

21 Claims, 6 Drawing Sheets

(56) References Cited

U.S. PATENT DOCUMENTS

| | | | | |
|---|---|---|---|---|
| 9,004,559 B2* | 4/2015 | Claffee | ................ | B25J 15/0475 |
| | | | | 294/111 |
| 2006/0145494 A1* | 7/2006 | Nihei | ..................... | B25J 9/1612 |
| | | | | 294/106 |
| 2006/0293615 A1* | 12/2006 | Valero-Cuevas | ...... | A61B 90/06 |
| | | | | 600/587 |
| 2011/0148132 A1* | 6/2011 | Park | ........................ | B25J 15/10 |
| | | | | 294/106 |
| 2014/0232124 A1* | 8/2014 | Dan | ...................... | B25J 15/022 |
| | | | | 294/198 |

FOREIGN PATENT DOCUMENTS

| | | | |
|---|---|---|---|
| JP | 2013-853 A | | 1/2013 |
| JP | 2013-52456 A | | 3/2013 |
| JP | 2015226968 A | * 12/2015 | ............ B25J 9/1612 |
| JP | 2017-164832 A | | 9/2017 |

* cited by examiner

ROBOT HAND AND CONTROL METHOD FOR THE ROBOT HAND

BACKGROUND

Field

The present disclosure relates to a robot hand and a control method for the robot hand.

Description of the Related Art

In recent years, assembly and processing of industrial products, such as cameras and printers, having small and complicated structures are being automated. Most of the parts used in such a kind of industrial products are small precision parts with various kinds of shapes.

In order to support gripping of such various kinds of parts, a robot hand that can realize various gripping forms adaptable to the parts having different shapes and dimensions is discussed (Japanese Patent Application Laid-Open No. 2017-164832). In Japanese Patent Application Laid-Open No. 2017-164832, the robot hand has three gripping fingers, and in order to realize various gripping forms, drive sources are disposed in all the three gripping fingers, respectively, to drive all the gripping fingers independently.

In order to accurately control the gripping fingers, generally a position detection mechanism such as an encoder is disposed in the drive source of each of the gripping fingers to enable performing feedback control. In Japanese Patent Application Laid-Open No. 2017-164832, however, the feedback control for the plurality of drive sources is executed by one control unit that controls the entire robot hand. Accordingly, control is concentrated in this control unit, and the control becomes complicated.

Further, the number of position detection mechanisms corresponding to the number of the drive sources is necessary to perform the feedback control on the drive sources, respectively. However, the structure of the robot hand becomes complicated if these position detection mechanisms are mounted. For example, the number of cables required for communication with the respective mechanisms increases. These cables are connected to the control unit installed outside a robot device, and are desirably connected so as to pass through a robot arm in order to prevent disconnection. However, since the number of the cables is large, it is difficult to accommodate the cables in the robot arm.

SUMMARY

Embodiments of the present disclosure are directed to a robot hand which is easily controllable and which allows easy routing of the cables even when the number of targets to be controlled increases.

According to an aspect of the present disclosure, a robot device includes a robot hand that has at least three finger portions on a base and grips a target object, and a robot hand control unit that controls the robot hand. Each of the three finger portions includes a plurality of drive mechanisms configured to bring the three finger portions close to or separate from each other independently, a position detection unit configured to detect positions of the three finger portions, and a plurality of drive control units configured to execute feedback control individually on each of a plurality of drive sources of the plurality of drive mechanisms, based on detection results from the position detection unit. The base having the three finger portions includes a distribution control unit configured to distribute a control value from the robot hand control unit to the plurality of drive control units associated with the three finger portions.

Further features will become apparent from the following description of exemplary embodiments with reference to the attached drawings.

DESCRIPTION OF THE EMBODIMENTS

An exemplary embodiment is described below with reference to the accompanying drawings. The exemplary embodiment described below is only an example, and thus a person skilled in the art can appropriately change, for example, details of a configuration without departing from the scope of the embodiment.

Figure 1:
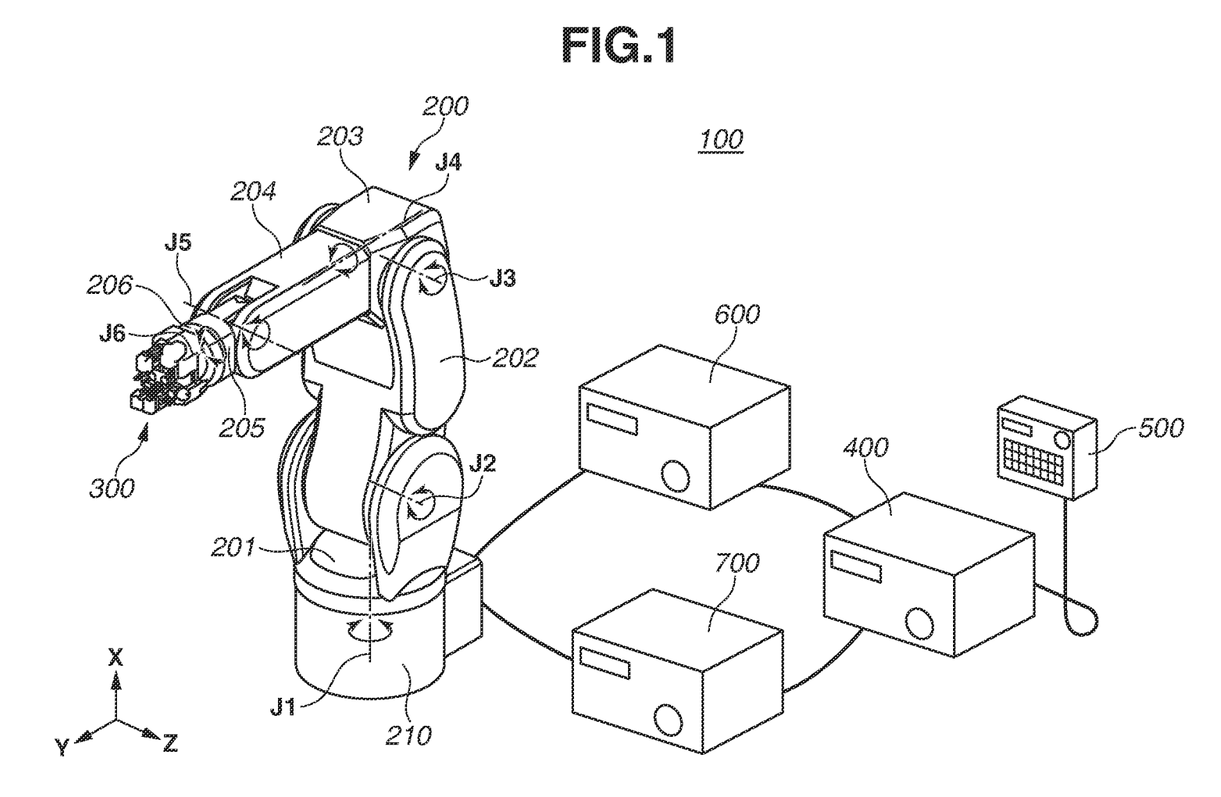
FIG. 1 is a schematic diagram of a robot system according to a first exemplary embodiment.

FIG. 1 illustrates a schematic configuration of a robot system 100 according to a first exemplary embodiment. In FIG. 1, the robot system 100 includes a robot arm main body 200 that is configured as an articulated robot, a robot hand main body 300, a system control device 400 that controls the robot arm main body 200 and the robot hand main body 300, and an external input device 500. The robot system 100 further includes a robot arm control device 600 and a robot hand control device 700 that receive an instruction from the system control device 400 and control the robot arm main body 200 and the robot hand main body 300, respectively.

The robot arm main body 200 according to the present exemplary embodiment is a six-axis articulated main body. The robot arm main body 200 includes a base 210 and six robot arm links 201 to 206. The robot arm links 201 to 206 are respectively driven to be rotated about joint axes J1 to J6 as illustrated by the arrows.

As illustrated in the drawing, the base 210 and the robot arm link 201 of the robot arm main body 200 are connected to each other via a drive source, not illustrated. The robot arm link 201 has a movable range from an initial attitude to arrow directions around the joint axis J1.

The robot arm link 201 and the robot arm link 202 of the robot arm main body 200 are connected to each other via a drive source, not illustrated. The robot arm link 202 has a movable range from an initial attitude to arrow directions about the joint axis J2.

The robot arm link 202 and the robot arm link 203 of the robot arm main body 200 are connected via a drive source, not illustrated. The robot arm link 203 has a movable range from an initial attitude to arrow directions about the joint axis J3.

The robot arm link 203 and the robot arm link 204 of the robot arm main body 200 are connected to each other via a drive source, not illustrated. The robot arm link 204 has a movable range from an initial attitude to arrow directions about the joint axis J4.

The robot arm link 204 and the robot arm link 205 of the robot arm main body 200 are connected to each other via a drive source, not illustrated. The robot arm link 205 has a movable range from an initial attitude to arrow directions about the joint axis J5.

The robot arm link 205 and the robot arm link 206 of the robot arm main body 200 are connected via a drive source, not illustrated. The robot arm link 206 has a movable range from an initial attitude to arrow directions around the joint axis J6.

The robot hand main body 300 is attached to the robot arm link 206 at a tip of the robot arm main body 200. The robot hand main body 300 is moved by the robot arm main body 200 to perform a gripping operation on a target object at any position. A detailed configuration of the robot hand main body 300 will be described below.

The system control device 400 controls the overall robot system 100. The system control device 400 transmits an instruction to the robot arm control device 600 and the robot hand control device 700, and the control devices control the robot arm main body 200 and the robot hand main body 300, respectively. The robot hand main body 300 can be positioned at any three-dimensional position to grip the target object.

The external input device 500 is a teaching device that transmits data of a plurality of teaching points to the system control device 400. The external input device 500 is used mainly when an operator specifies operations of the robot arm main body 200 and the robot hand main body 300 in an installation site of the robot system 100.

Figure 2A:
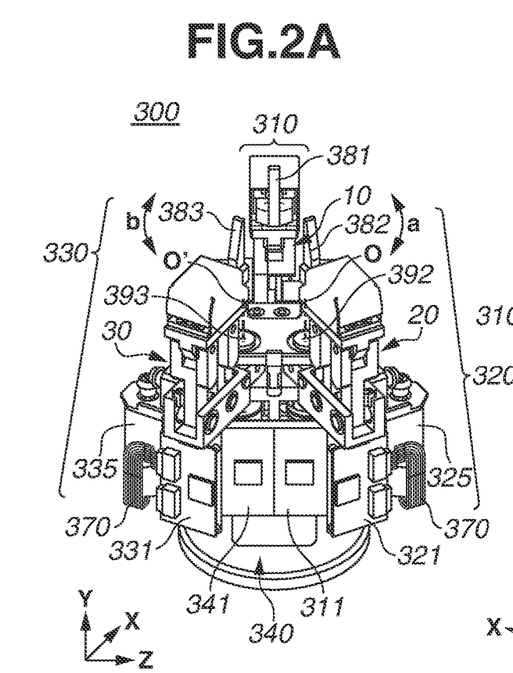
FIGS. 2A, 2B, and 2C are detailed diagrams of a robot hand main body according to the first exemplary embodiment.
Figure 2B:
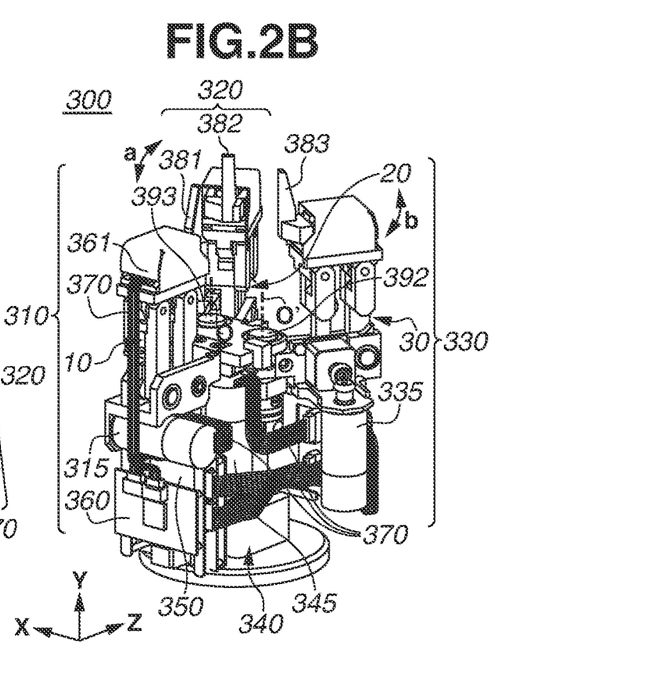
Figure 2C:
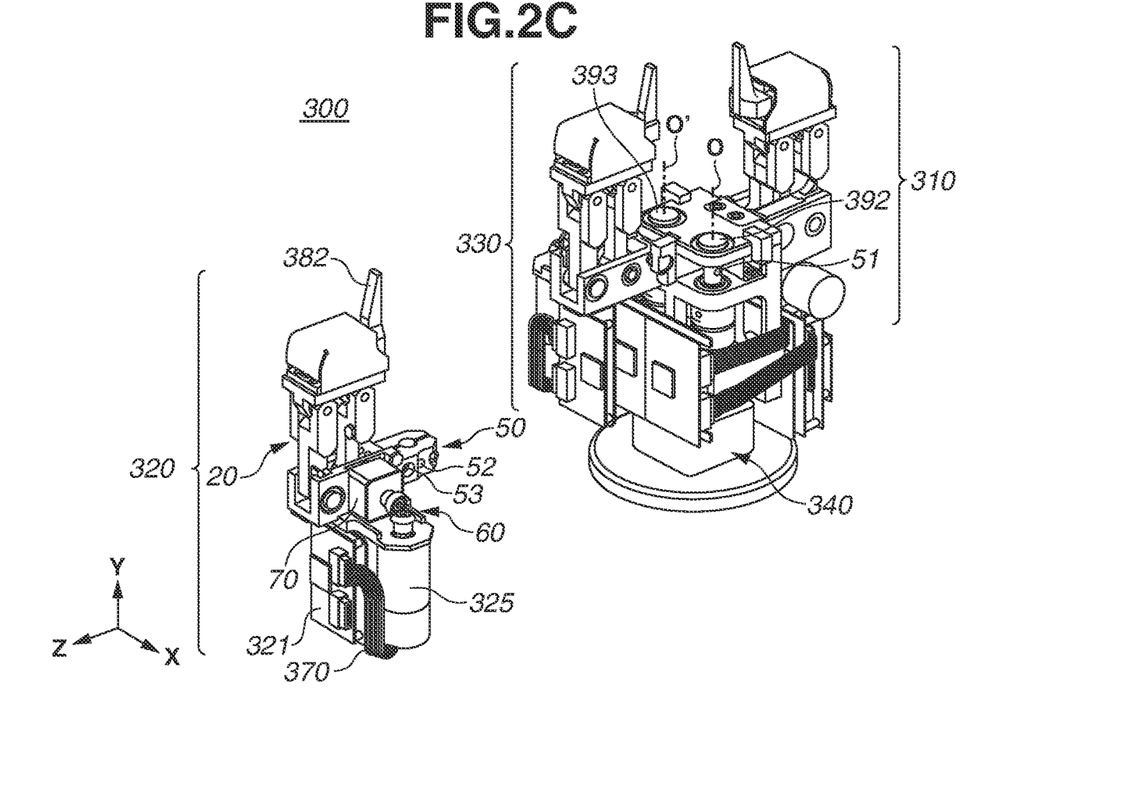

FIGS. 2A to 2C illustrate a schematic configuration of the robot hand main body 300 according to the first exemplary embodiment. FIGS. 2A and 2B are perspective views of the robot hand main body 300. FIG. 2C is a diagram illustrating a state where a finger portion 320 is dismounted from a base 340. The base 340 includes a motor 345 for turning, described below, a motor control unit 341 that controls the motor 345, a distribution control unit 350, a sensor operation substrate 360, and turning drive shafts 392 and 393.

As illustrated in FIGS. 2A and 2B, the robot hand main body 300 according to the present exemplary embodiment includes three finger portions 310, 320, and 330 mounted to the base 340. The finger portions include contact portions 381, 382, and 383, respectively, that come into contact with a target object.

The finger portions 310, 320, and 330 include motors 315, 325, and 335, respectively, that bring the contact portions 381, 382, and 383 close to or separate from each other. The motors 315, 325, and 335 have encoders 316, 326, and 336 (FIG. 4), respectively, that measure rotation angles. The provision of the encoders allows positions of the contact portions to be precisely controlled.

The motors 315, 325, and 335 of the robot hand main body 300 bring the contact portions 381, 382, and 383 close to or separate from each other via the parallel link mechanisms 10, 20, and 30. The parallel link mechanisms 10, 20, and 30 according to the present exemplary embodiment are configured by four-joint link mechanisms. This configuration can bring the contact portions 381, 382, and 383 close to or separate from each other while their attitudes are maintained in a parallel state. Any mechanisms other than the four-joint link mechanisms may be used as long as they can bring the contact portions 381, 382, and 383 close to or separate from each other while the attitudes are maintained in the parallel state.

The motors 315, 325, and 335 and the parallel link mechanisms 10, 20, and 30 are described as one example of a plurality of drive mechanisms that brings the three finger portions close to or separate from each other independently.

Further, in the present exemplary embodiment, the motor 345 is mounted to the base 340 so that the two finger portions 320 and 330 of the three finger portions can turn in directions of arrows a and b. The finger portions 320 and 330 are disposed detachably from the turning drive shafts 392 and 393. The turning drive shafts 392 and 393 turn about axes O and O', respectively. As a result, the finger portion 320 and the finger portion 330 can be turned in the directions of arrows a and b about the axes O and O', respectively. The motor 345 rotates the turning drive shafts 392 and 393 through a gear mechanism, not illustrated. Note that the turning drive shafts 392 and 393 rotate in opposite directions in synchronization through the gear mechanism, not illustrated.

The motor 345 is provided with an encoder 346 (FIG. 4) that measures a rotational angle similarly to the motors 315, 325, and 335 of the finger portions, and thus turning positions of the finger portions 320 and 330 can be precisely controlled.

The above-described gear mechanism is one example of turning mechanism, and the motor 345 is one example of a turning drive source. The turning mechanism includes the turning drive shafts 392 and 393.

Further, motor control units 311, 321, 331, and 341 that control the motors 315, 325, 335, and 345, respectively, are mounted on the robot hand main body 300 according to the present exemplary embodiment. In particular the finger portions 320 and 330 to be driven to be turned are configured in such a manner that the motors 325 and 335 and the motor control units 321 and 331 that control the motors 325 and 335, respectively, are provided integrally with each other. Accordingly, the motors 325 and 335 and the motor control units 321 and 331 can turn together with the finger portions 320 and 330. That is, in the finger portions 320 and 330, the motors 325 and 335 and the motor control units 321 and 331 are configured as a unit. The detailed configuration will be described below.

The motor control units 311 and 341 that control the motors 315 and 345, respectively, are disposed on the base 340. Further, the distribution control unit 350 that distributes communication and electric power to the motor control units is disposed on a surface opposite from the surface where the motor control units 311 and 341 are disposed (FIG. 2B). As a result, the motor control units 311, 321, 331, and 341 can be connected collectively to the robot hand control device 700. Details of the distribution control unit 350 will be described below.

Further, a force sensor 361 that detects an external force applied to a contact portion 381 is disposed on the contact portion 381 of the finger portion 310. The finger portion 310 includes the sensor operation substrate 360 that converts a change in a voltage detected by the force sensor 361 into force information.

Further, a cable 370 that connects the motor control units 311, 321, 331, and 341, and the sensor operation substrate 360 to the system control device 400 is routed as illustrated in FIGS. 2A to 2C. Note that the cable 370 is used also for communication between the motors and the motor control units, and communication between the force sensor 361 and the sensor operation substrate 360.

Herein, the finger portion 310 is not turned by the motor 345. The provision of the force sensor 361 to the finger portion 310 can reduce a frequent operation of the force sensor 361, and thus can reduce damage to the cable 370 of the force sensor 361.

As illustrated in FIG. 2C, the finger portions 320 and 330 of the robot hand main body 300 according to the present exemplary embodiment of the present invention are detachable from the base 340. FIG. 2C illustrates a state where the finger portion 320 is detached from the base 340 as an example. A configuration of the finger portion 320 will be described below. Note that the finger portion 330 has a similar configuration.

As illustrated in the drawing, a fastening portion 50 is provided in the finger portion 320 to detachably fasten the finger portion 320 to the base 340. The fastening portion 50 pinches the turning drive shaft 392 through a recessed groove 54 to attach the turning drive shaft 392 and the finger portion 320. A protrusion 51 is provided on the turning drive shaft 392, and a recess 52 is provided in an inner surface of the recessed groove 54 of the fastening portion 50. When the turning drive shaft 392 is pinched by the fastening portion 50, the protrusion 51 is fitted into the recess 52, and the turning drive shaft 392 and the finger portion 320 are set in position.

Further, an internally threaded hole 53 is provided in the fastening portion 50. A bolt, not illustrated, is inserted into the hole 53 to be fastened therein with the turning drive shaft 392 being pinched by the fastening portion 50. As a result, an attachment state of the finger portion 320 and the turning drive shaft 392 is maintained.

Further, a bevel gear 60 is provided to an output shaft of the motor 325 that drives the parallel link mechanism 20 of the finger portion 320 so as to bend the a transmission path of the motive power at a right angle and to transmit motive power to an input shaft of a reduction gear 70. An output shaft of the reduction gear 70 is connected to the parallel link mechanism 20, and drive power of the motor 325 is transmitted to the parallel link mechanism 20 after being decelerated by the reduction gear 70. The parallel link mechanism 20 is then driven to operate the contact portion 382. At this time, the reduction gear 70 is preferably a wave reduction gear in order to reduce a backlash.

As described above, the bevel gear 60 is used to change the transmission path for the motive power of the motor 325, and thus a space for mounting the motor control unit 321 in parallel to a vicinity of the motor 325 can be provided. As a result, the motor 325 and the motor control unit 321 can be integrally disposed in the finger portion 320.

As described above, the motor 325 and the motor control unit 321 are provided in the finger portion 320 integrally as a unit so as to be detachable from the base 340.

Figure 3A:
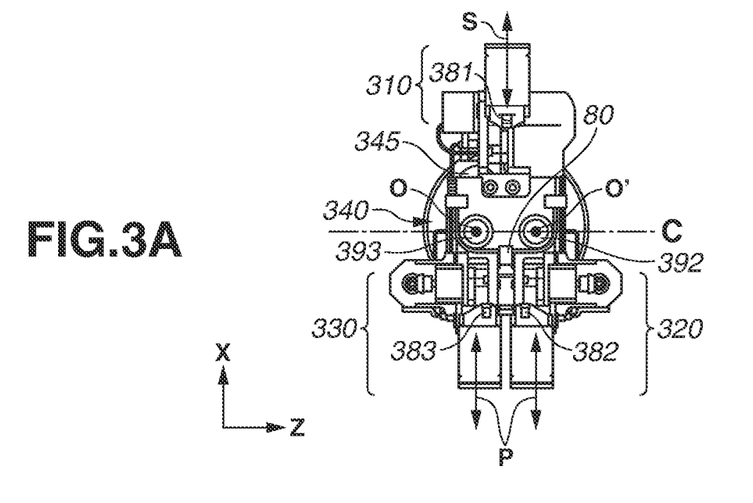
FIGS. 3A, 3B, and 3C are diagrams illustrating an operation of the robot hand main body according to the first exemplary embodiment.
Figure 3B:
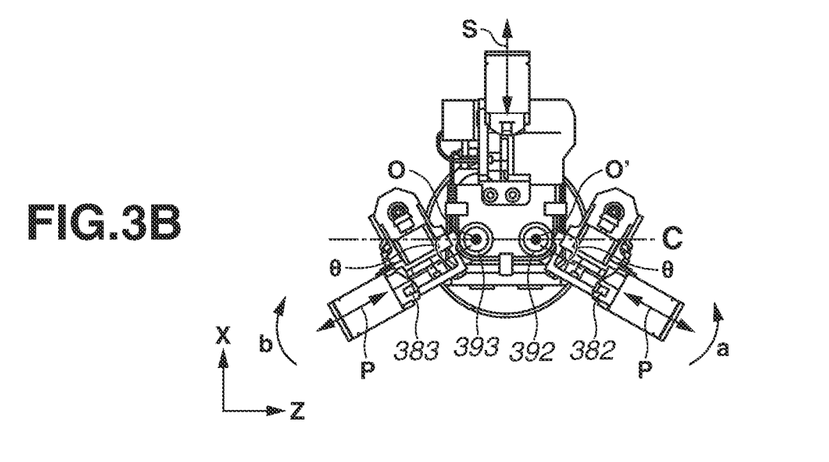
Figure 3C:
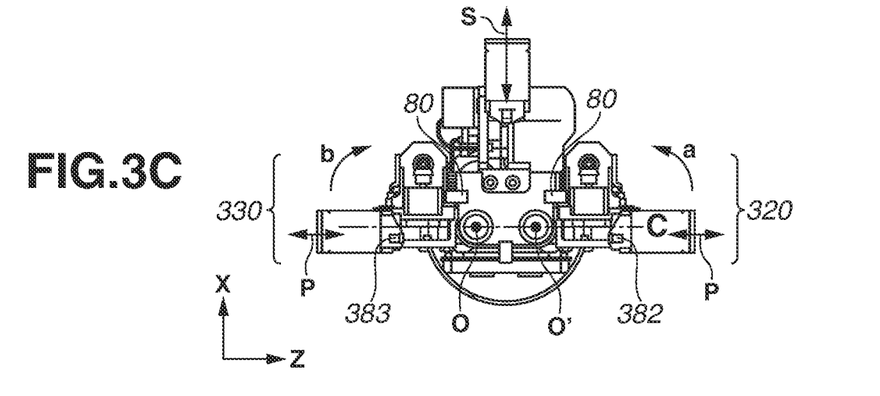

FIGS. 3A to 3C are top views illustrating an operation of the robot hand main body 300 according to the present exemplary embodiment. FIG. 3A illustrates a state where a close/separate direction P of the contact portions 382 and 383 of the finger portions 320 and 330 is approximately vertical to an alternate long and short dash line C connecting the axis O and the axis O'. A close/separate direction of the contact portion 381 is indicated by an arrow S. FIG. 3B illustrates a state where an angle θ formed by the close/separate direction P and the alternate long and short dash line C is approximately 30°. FIG. 3C illustrates a state where the close/separate direction P is approximately parallel with the alternate long and short dash line C.

The motor 345 inside the base 340 is driven to rotate the turning drive shafts 392 and 393 from the state in FIG. 3A. As a result, gripping forms in FIGS. 3B and 3C can be taken.

FIG. 3B illustrates a gripping form in which the turning drive shafts 392 and 393 are rotated from the state in FIG. 3A toward the arrows a and b, respectively, and the close/separate direction P of the contact portions 382 and 383 and the alternate long and short dash line C form an angle of 30°.

FIG. 3C illustrates a gripping form in which the turning drive shafts 392 and 393 are further driven from FIG. 3B toward the arrows a and b, respectively, and the close/separate direction P and the alternate long and short dash line C are substantially parallel to each other. At this time, stoppers 80 for limiting a turning range are provided to the base 340 so as to prevent the finger portions 320 and 330 from further turning toward the arrows a and b, respectively, and from interfering with the finger portion 310.

Similarly, the stoppers 80 for limiting the turning range are provided to the base 340 so as to prevent, when the gripping form of FIG. 3C is returned to the gripping form of FIG. 3A, the finger portion 320 and the finger portion 330 from turning excessively and interfering with each other.

As described above, various gripping forms are made possible by the motors 315, 325, and 335 that bring the contact portions 381, 382, and 383 of the finger portions 310, 320, and 330 close to or separate from each other, and the motor 345 that turns the finger portions 320 and 330. The various gripping forms enables gripping of a variety of target objects.

Figure 4:
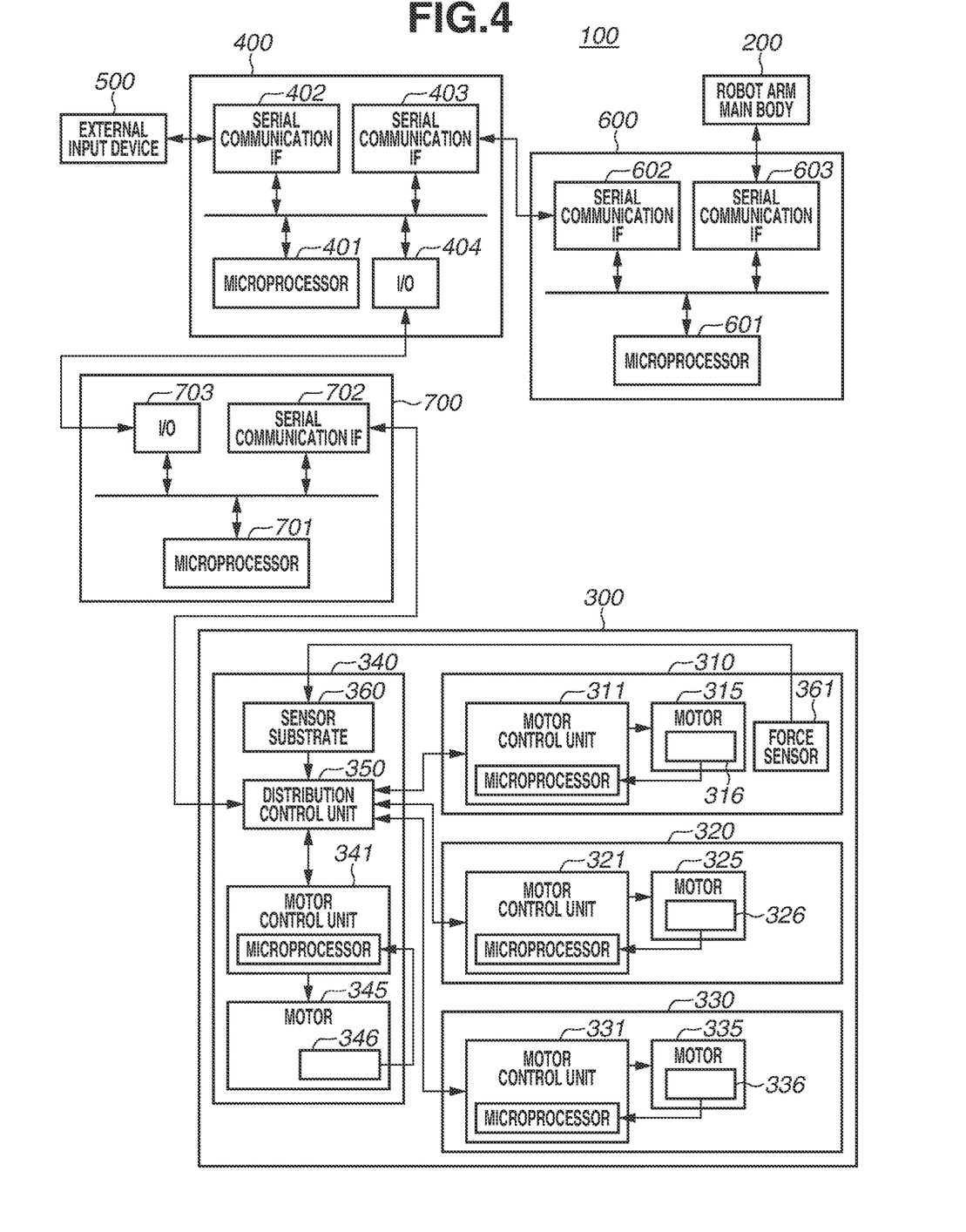
FIG. 4 is a detailed control block diagram of a control system of the robot system according to the first exemplary embodiment.

FIG. 4 is a block diagram illustrating details of a control system of the robot system 100 according to the present exemplary embodiment. As illustrated in FIG. 4, in the robot system 100 according to the present exemplary embodiment, the system control device 400 that controls the entire robot system transmits an instruction relating to an operation to the robot arm control device 600 and the robot hand control device 700. The robot arm control device 600 and the robot hand control device 700 control the robot arm main body 200 and the robot hand main body 300, respectively, based on the instruction from the system control device 400. The control system of the robot hand main body 300 will be described in detail below, and description about details relating to the control of the robot arm main body 200 will be omitted.

In FIG. 4, the system control device 400 includes a microprocessor 401 having a read-only memory (ROM) (not illustrated) and a random access memory (RAM) (not illustrated). The ROM stores necessary data and a program according to various operations of the robot system 100. The RAM is used as a working area of a central processing unit (CPU) (not illustrated). The system control device 400 is connected to the external input device 500 and the robot arm control device 600 via serial communication interfaces 402 and 403, respectively. The system control device 400 is connected to the robot hand control device 700 via an input/output interface 404.

A configuration similar to that described above is provided also to the robot arm control device 600 and the robot hand control device 700. The robot arm control device 600 and the robot arm main body 200 are connected to each other by serial communication. A serial communication interface 702 of the robot hand control device 700 is connected to the robot hand main body 300.

For example, a control area network (CAN) communication protocol is used for the communication between the robot hand control device 700 and the robot hand main body 300. The respective control units are connected to each other by a CAN communication bus.

As illustrated in the drawing, the system control device 400 transmits the instruction relating to the operation of the robot hand main body 300 to the robot hand control device 700. The instruction from the system control device 400 is a simple instruction value for specifying which target object is to be gripped.

The robot hand control device 700 receives the instruction from the system control device 400, and performs an operation according to a type of target object to be gripped. The robot hand control device 700 collectively transmits control values of the motors 315, 325, 335, and 345 to the distribution control unit 350. At this time, the robot hand control device 700 determines the control values of the motors 315, 325, 335, and 345 in consideration of the instruction received from the system control device 400 and a current state of the robot hand main body 300.

The determined control values of the motors 315, 325, 335, and 345 are transmitted to the motor control units 311, 321, 331, and 341 via the distribution control unit 350. The distribution control unit 350 distributes and transmits the corresponding control values to the motor control units 311, 321, 331, and 341.

The motor control units that receive the control values from the distribution control unit 350, respectively, operate the motors to move the finger portions, and acquire information from the encoders 316, 326, 336, and 346 provided to the motors, respectively. The motors are feedback controlled so that the finger portions 310, 320, and 330 come to positions according to the control values, respectively. The motor control units 311, 321, and 331 control the positions of the contact portions 381, 382, and 383 of the finger portions 310, 320, and 330. The motor control unit 341 controls turning positions of the finger portions 320 and 330.

At this time, the motor control units 311, 321, 331, and 341 always transmit the current turning positions of the contact portions 381, 382, and 383 and the finger portions 320 and 330 to the robot hand control device 700 via the distribution control unit 350. Further, if any of the motor control units 311, 321, 331, and 341 does not perform the transmission, the motor control unit that does not perform the transmission is detected to be abnormal. Further, identifications (IDs) are allocated to the motor control units 311, 321, 331, and 341, and the IDs make determination of an abnormal part easy.

In this way, the robot hand control device 700 determines the control values of the motors, and determines whether the state of the robot hand main body 300 is normal or abnormal. If it is determined that the state is abnormal, the robot hand control device 700 transmits a stop instruction to the system control device 400 or the robot arm control device 600.

In the present exemplary embodiment, the finger portion 310 has the triaxial force sensor 361 inside the contact portion 381. The sensor operation substrate 360 disposed on the base 340 performs an operation on a detection value from the force sensor 361 to obtain a force value, and transmits the force value to the robot hand control device 700 via the distribution control unit 350.

In the present exemplary embodiment, the detection value from the force sensor 361 is transmitted to the robot hand control device 700. Alternatively, the detection value may be transmitted to the motor control units 311, 321, and 331 to execute feedback control by the force sensor 361.

The finger portions 310, 320, and 330 grip a target object through control made by the motor control units 311, 321, and 331. The gripping the target object is determined by the distribution control unit 350 based on the detection value from the force sensor 361. An instruction value for the gripping detection is transmitted to the robot hand control device 700.

On receiving the instruction value of the gripping detection, the robot hand control device 700 instructs the robot arm control device 600 to assemble the gripped target object, via the robot system control device 400.

The robot arm control device 600 then controls the robot arm main body 200 to assemble the target object gripped by the robot hand main body 300 to another target object.

The motor control units 311, 321, and 331 are examples of a drive control unit, and the motor control unit 341 is an example of a turning control unit.

The robot hand control device 700 that controls the entire operation of the robot hand main body 300 only needs to determine the control values or control commands and control amounts of the motors 315, 325, 335, and 345. Thereafter, the motor control units 311, 321, 331, and 341 mounted to the finger portions 310, 320, and 330 and the base 340, respectively, executes the feedback control on the motors based on the values from the encoders 316, 326, 336, and 346. As a result, the robot hand control device 700 does not have to monitor the positions of the finger portions 310, 320, and 330, and thus the entire operation of the robot hand main body 300 is easily controlled.

Further, since the motors 315, 325, and 335 and the motor control units 311, 321, and 331 are respectively disposed in the finger portions 310, 320, and 330 integrally, the communication cables between the motor control units 311, 321, and 331 and the motors 315, 325, and 335 can be accommodated in the finger portions 310, 320, and 330. Further, since the distribution control unit 350 is also disposed on the base 340, the cables 370 between the motor control units 311, 321, 331, and 341 and the robot hand control device 700 can be unified by the distribution control unit 350.

Therefore, the distribution control unit 350 enables the communication between the motor control units 311, 321, 331, and 341 and the robot hand control device 700 by one cable. Accordingly, the cable routed from the robot hand control device 700 to the robot hand main body 300 can be easily accommodated inside the robot arm main body 200.

Further, the finger portions 320 and 330 that are frequently driven by the turning operation are disposed detachably from the base 340. In a case where a part of the finger portion is broken, maintenance work can be easily performed.

Further, in controlling the finger portions of the robot hand, there is a case where all the finger portions are desired to be driven in a synchronous manner in order to perform a wide variety of gripping. In the present exemplary embodiment, the distribution control unit 350 that distributes a control value from the robot hand control device 700 is disposed on the base 340 where all the finger portions 310, 320, and 330 are disposed.

As a result, lengths of the cables from the distribution control unit 350 to the motor control units 311, 321, and 331 of the finger portions can be set to be equivalent to each other. In this way, a delay in the synchronous driving caused by a difference in the cable lengths when synchronously driving the finger portions that are independently driven can be reduced.

In the robot hand main body 300 described above, the finger portions 310, 320, and 330 are independently driven. For this reason, in order to perform precise gripping, the driving of the motors 315, 325, 335, and 345 needs to be accurate. Particularly if home positions for the driving of the motors 315, 325,335, and 345 are displaced, the finger portions 310, 320, and 330 are displaced and thus the precise gripping becomes difficult. Home position setting of the motors according to the present exemplary embodiment is described in detail below.

Figure 5A:
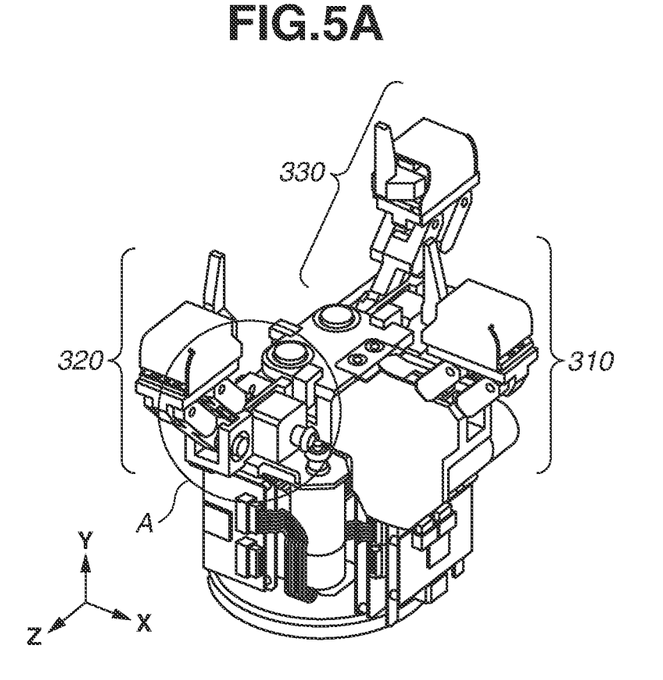
FIGS. 5A and 5B are detailed diagrams of mechanisms that set home positions of finger portions according to the first exemplary embodiment.
Figure 5B:
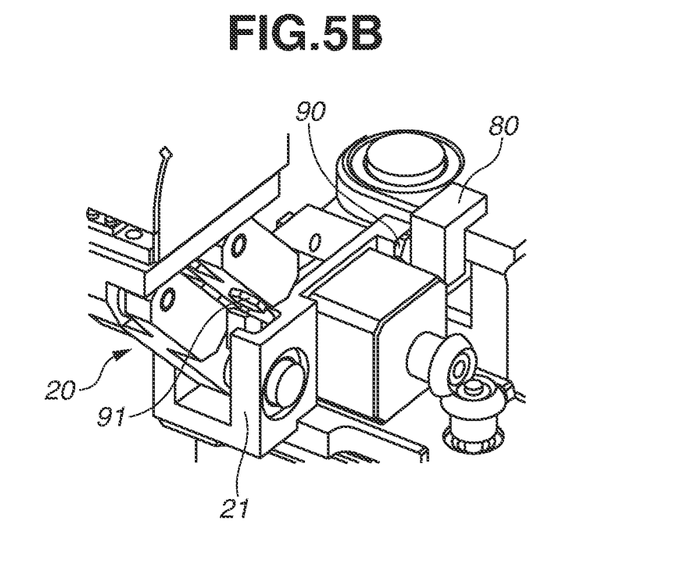
Figure 6:
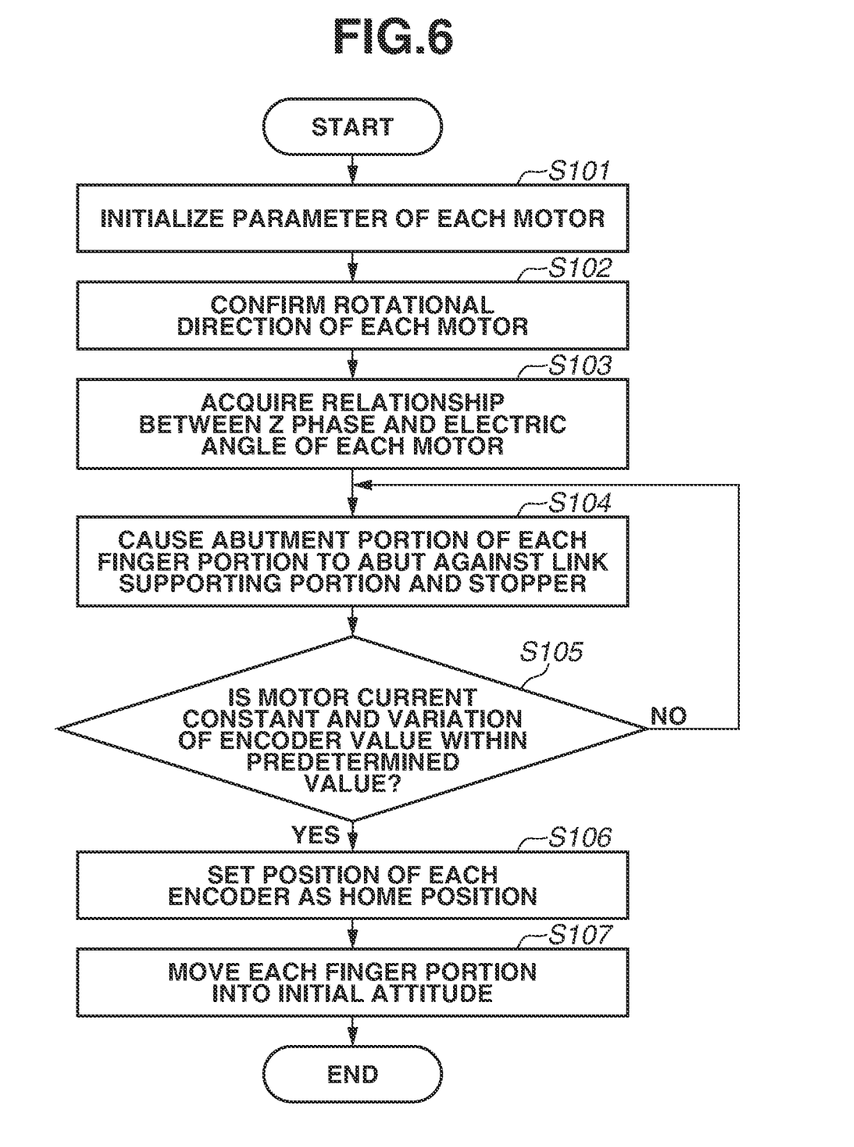
FIG. 6 is a flowchart illustrating a case where the home positions are set for the finger portions of the robot hand main body according to the first exemplary embodiment.

FIGS. 5A and 5B are detailed diagrams of a mechanism that sets the home positions of the motors 315, 325, and 335 in the finger portions 310, 320, and 330 according to the present exemplary embodiment. FIG. 5A is a perspective view of the gripping form illustrated in FIG. 3C, and FIG. 5B is an enlarged view of an area A in FIG. 5A. FIG. 6 is a flowchart illustrating the home position setting of the motors 315, 325, and 335 in the finger portions 310, 320, and 330.

As illustrated in FIG. 5A, in the robot hand according to the present exemplary embodiment, when the home positions of the finger portions 310, 320, and 330 are set, the finger portions 310, 320, and 330 are separated from each other.

With reference to FIG. 5B, abutment portions 90 and 91 are provided to the finger portion 320. The abutment portion 91 abuts against a link supporting portion 21 that supports the parallel link mechanism 20, and the abutment portion 90 abuts against the stopper 80 described above. As a result, an abutment position between the abutment portion 91 and the link supporting portion 21 can be set as the home position of the motor 325, and an abutment position between the abutment portion 90 and the stopper 80 can be set as the home position of the motor 345 that performs the turning driving.

The abutment portions 90 are disposed similarly in the finger portions 310 and 330, respectively, and thus the home positions of the motors 315 and 335 provided to the finger portions 310 and 330 can be set. According to the present exemplary embodiment, the abutment portion 91 is provided to the finger portion 320, but since the finger portions 320 and 330 turn synchronously by the motor 345, even if the abutment portion 91 is provided to the finger portion 330, the similar effect can be obtained.

FIG. 6 illustrates a flow of the home position setting of the motors 315, 325, and 335 in the finger portions 310, 320, and 330 according to the present exemplary embodiment. When the robot hand control device 700 receives a command for starting the home position setting from the system control device 400, the robot hand control device 700 transmits the command for starting the home position setting to the motor control units 311, 321, and 331 of the finger portions 310, 320, and 330, and the flow starts.

In a case where the command for starting the home position setting is received, in step S101, the motor control units 311, 321, 331, and 341 initialize parameters of the motors 315, 325, 335, and 345, respectively.

The processing proceeds to step S102, and the rotational directions of the motors 315, 325,335, and 345 are confirmed. Since Z phases of the motors cannot be searched if the abutment portions 90 and 91 abut against the stoppers 80 and the link supporting portions 21, respectively, the movable directions of the motors are confirmed. The stoppers 80 and the link supporting portions 21 are members configuring the base 340.

The processing proceeds to step S103, and a relationship between the Z phases and electric angles of the motors is obtained.

In step S104, the motors 315, 325, 335, and 345 are driven until the abutment portions 90 provided to the finger portions 310, 320, and 330 and the abutment portion 91 provided to finger portion 320 abut against the link supporting portions 21 and the stoppers 80, respectively.

When the motors 315, 325, 335, and 345 are driven, in step S105, a determination is made whether current values of the motors are constant and variations of encoder values are within predetermined values. If Yes in step S105, the processing proceeds to step S106. If No in step S105, the processing returns to immediately before step S104, and the abutment of the abutment portions 90 and 91 is continued.

If Yes in step S105, the processing proceeds to step S106, and positions of the encoders 316, 326, 336, and 346 at that time are set as the home positions of the motors 315, 325, 335, and 345 that perform the close/separate operation of the contact portions 381, 382, and 383 and the turning operation of the finger portions 310, 320, and 330.

In step S107, the finger portions 310, 320, and 330 are moved to predetermined positions that are the initial attitudes, and a signal that indicates completion of the home position setting is transmitted to the robot hand control device 700. The flow of the home position setting is then ended.

According to the present exemplary embodiment, the command for starting the home position setting is transmitted simultaneously to the motor control units 311, 321, 331, and 341 from the robot hand control device 700, but the command may be individually transmitted to the motor control units 311, 321, 331, and 341.

Further, the home position of the motor 345 performing the turning of the finger portions 320 and 330 is preferably set after the home positions of the other motors 315, 325, and 335 are set. This enables all the finger portions 310, 320, and 330 to be located in a desired close/separate direction. Therefore, when the home position of the motor 345 is set, a danger of collision between the finger portions can be eliminated.

A processing procedure according to the present exemplary embodiment is, specifically, executed by the robot hand control device 700. Therefore, the present invention includes a control program as software that realizes the above-described functions and a recording medium that records the program.

In the above exemplary embodiment, a case where microprocessors 601, 401, and 701 store the control program in a recording medium readable by a computer, but the present invention is not limited to this form. The control program for carrying out the present invention may be recorded in any recording medium as long as the recording medium is readable by a computer. For example, as the recording medium for supplying the control program, a hard disc drive (HDD), an external storage device, or a recording disc may be used.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure is applicable to industrial robots.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-239915, filed Dec. 14, 2017, which is hereby incorporated by reference herein in its entirety.

What is claimed is:

1. A robot device comprising:
a robot hand configured to grip a target object, the robot hand including a plurality of finger portions on a base; and
a robot hand control unit configured to control the robot hand,
wherein the robot hand includes
a plurality of drive sources configured to bring the finger portions close to or separate from each other,
a plurality of first control units configured to control individually each of the plurality of drive sources; and
a second control unit configured to distribute a control value from the robot hand control unit to the plurality of first control units associated with the finger portions.

2. The robot device according to claim 1, wherein at least one of the finger portions is configured so that the drive source and the drive control unit are integral with each other and are detachable from the base.

3. The robot device according to claim 2, wherein a cable from the first control unit of one of the finger portions attachable to the base is removable from the base together with the at least one of the finger portions attachable to the base, the drive source and the first control unit.

4. The robot device according to claim 1,
wherein the plurality of finger portions is at least three finger portions,
wherein the base includes
a turning drive source configured to turn two of the three finger portions to change a position of the two of the three finger portions with respect to the target object such that the two of the three finger portions are positioned closer to or separate from the target object, and
a third control unit configured to control the turning drive source, and
wherein the second control unit distributes the control value from the robot hand control unit to the plurality of first control units associated with the respective three finger portions and to the third control unit.

5. The robot device according to claim 4,
wherein in the three finger portions, the finger portion that is not turned by the turning drive source has a force detection unit configured to detect a force applied to the finger portion, and
wherein the second control unit receives a detection result from the force detection unit and distributes the detection result to the plurality of first control units.

6. The robot device according to claim 5, wherein the second control unit determines whether a detection result of the force detection unit is output to at least one of the plurality of first control units or to the robot hand control unit.

7. The robot device according to claim 5, wherein the third control unit is disposed on the base and at a root of a finger portion that is not rotated by the turning drive source.

8. The robot device according to claim 4, wherein the turning drive source drives two of the three finger portions using a gear mechanism.

9. The robot device according to claim 4, wherein the base, the turning drive source, the second control unit and the third control unit are integrated.

10. The robot device according to claim 4, wherein the robot hand includes a stopper to prevent two of the finger portions rotated by the turning drive source from interfering with each other.

11. The robot device according to claim 1, wherein the robot hand control unit and the second control unit are connected to each other by serial communication.

12. The robot device according to claim 1, wherein the plurality of drive sources drives the finger portions using bevel gears.

13. The robot device according to claim 1, wherein the plurality of drive sources drives the finger portions using parallel link mechanisms.

14. The robot device according to claim 1, wherein a wave reduction gear is connected to the plurality of drive sources.

15. The robot device according to claim 1, wherein the second control unit is disposed on the base.

16. The robot device according to claim 1,
wherein each of the plurality of drive sources includes a position detection unit configured to detect a position of a rotation shaft, and
wherein the plurality of first control units executes feedback control on the plurality of drive sources corresponding to the plurality of first control units based on the position detection unit.

17. The robot device according to claim 1, wherein cables from the plurality of first control units are connected to the second control unit and disposed on the base.

18. A control method for a robot device, the robot device including
a robot hand configured to grip a target object, the robot hand including a plurality of finger portions on a base, and
a robot hand control unit configured to control the robot hand,
wherein the robot hand includes
a plurality of drive sources configured to bring the finger portions close to or separate from each other,
a plurality of first control units configured to control individually each of the plurality of drive sources, and
wherein a second control unit configured to distribute a control value from the robot hand control unit to the plurality of first control units associated with the finger portions, the control method comprising:

causing the robot hand control unit to transmit control values associated with the respective plurality of first control units collectively to the second control unit;

causing the second control unit to distribute the control values from the second control unit to the plurality of first control units associated with the finger portions, respectively; and causing the plurality of first control units to operate the plurality of drive sources, to move the finger portions based on the control values from the second control unit.

19. The control method according to claim 18, further comprising:

causing the robot hand control unit to transmit, to the second control unit, control values for setting home positions of the plurality of drive sources;

causing the second control unit to distribute the control values for causing the plurality of drive sources to set the home positions from the robot hand control unit to the plurality of first control units associated with the finger portions; and causing the plurality of first control units to abut abutment portions provided on the finger portions, respectively, against members included in the base and to set abutment positions as the home positions of the plurality of drive sources.

20. An assembly method for articles using a robot device, the robot device including a robot hand configured to grip a target object, the robot hand including a plurality of finger portions on a base, and a robot hand control unit configured to control the robot hand, wherein the robot hand includes a plurality of drive sources configured to bring the finger portions close to or separate from each other, a plurality of first control units configured to control individually on each of the plurality of drive sources, and wherein a second control unit configured to distribute a control value from the robot hand control unit to the plurality of first control units associated with the finger portions, the assembly method comprising:

causing the robot hand control unit to transmit, to the second control unit, control values that are associate with the plurality of the first control units and are for gripping the target object;

causing the second control unit to distribute the control values from the robot hand control unit to the plurality of first control units associated with the finger portions, respectively;

causing the plurality of first control units to operate the plurality of drive sources, to move the finger portions based on the control values from the second control unit, and to grip the target object with the finger portions; and causing the robot hand control unit to assemble the gripped target object to another target object.

21. A non-transitory storage medium configured to store a control program for executing a control method for a robot device, the robot device including a robot hand configured to grip a target object, the robot hand including a plurality of finger portions on a base, and a robot hand control unit configured to control the robot hand, wherein the robot hand includes a plurality of drive sources configured to bring the finger portions close to or separate from each other, a plurality of first control units configured to control individually each of the plurality of drive sources, and wherein a second control unit configured to distribute a control value from the robot hand control unit to the plurality of first control units associated with the finger portions, the control method comprising:

causing the robot hand control unit to transmit, to the second control unit, control values associated with the respective plurality of first control units collectively;

causing the second control unit to distribute the control values from the robot hand control unit to the plurality of first control units associated with the finger portions, respectively; and causing the plurality of first control units to operate the plurality of drive sources, to move the finger portions based on the control values from the second control unit.

* * * * *